United States Patent [19]

Haas et al.

[11] 4,415,536

[45] Nov. 15, 1983

[54] APPARATUS FOR CONTACTING PARTICULATE MATERIAL WITH PROCESSING LIQUID

[75] Inventors: Paul A. Haas, Knoxville; Allen D. Ryon, Oak Ridge, both of Tenn.

[73] Assignee: The United States of America as represented by the U.S. Department of Energy, Washington, D.C.

[21] Appl. No.: 394,560

[22] Filed: Jul. 2, 1982

[51] Int. Cl.³ .................... G21C 21/00; B01J 8/12; B01J 8/20

[52] U.S. Cl. .................... 422/159; 422/140; 422/903; 425/10; 264/0.5; 252/635; 34/57 A

[58] Field of Search .................... 252/635; 264/0.5; 422/140, 145, 159, 903; 425/10; 34/57 A

[56] References Cited

U.S. PATENT DOCUMENTS 2,543,132  2/1951  Shabaker .................... 425/10 X

FOREIGN PATENT DOCUMENTS 121523  6/1946  Australia .................... 425/10

OTHER PUBLICATIONS

Perry, Robert H. and Cecil H. Chilton, Eds. *Chemical Engineer's Handbook* 5th Ed. 1973, McGraw—Hill, N.Y. pp. 5—45-5—54.
ORNL/TM-6746 "Sol-Gel Sphere-Pac Activities for the Fuel Refabrication and Development Program" Mar. 1979, p. 26.

*Primary Examiner*—Deborah L. Kyle
*Assistant Examiner*—Matthew A. Thexton
*Attorney, Agent, or Firm*—Edwin D. Grant; Stephen D. Hamel; Richard G. Besha

[57] ABSTRACT

Apparatus for contacting particles with a fluid includes two tubes having different diameters and each including a straight lower section inclined relative to the horizontal and a straight, vertical upper section, the lower ends of the tubes being joined together. Fluid introduced into the lower ends of the tubes allows particles to drop slowly in the larger diameter tube and fluidizes the same particles in the smaller diameter tube.

7 Claims, 2 Drawing Figures

APPARATUS FOR CONTACTING PARTICULATE MATERIAL WITH PROCESSING LIQUID

BACKGROUND OF THE INVENTION

This invention, which resulted from a contract with the United States Department of Energy, relates to an apparatus for contacting a fluid with particulate material and, more particularly, to an apparatus for contacting nuclear fuel microspheres with processing liquids.

The preparation of gel spheres containing fissile uranium requires efficient contact of the spheres with process liquids. For various reasons it would be advantageous to substitute continuously operating liquid-solid contacting equipment for the batch type apparatus which has been used heretofore for manufacturing such nuclear fuel. However, systems previously designed for aging and washing fuel spheres in a continuous type process have not provided satisfactory liquid-solid contact due to their failure to provide a controlled, efficient counter-current liquid flow which can move the fragile spheres through contact zones without damaging them. Recently, a U-shaped column was tested as a means for continuously contacting fuel spheres with a liquid flowing therein, but it was found that the curved configuration of the lower portion of the column allowed excessive accumulation of spheres therein, making it impossible to maintain constant and continuous sphere movement by manipulation of liquid flow and resulting in damage to the spheres. There is therefore a need for an effective means for contacting fuel spheres with process liquids under controlled counter-current flow conditions.

SUMMARY OF THE INVENTION

It is an object of this invention to provide an apparatus in which nuclear fuel spheres can be contacted with a process liquid in a continuous flow process without being damaged.

Another object of the invention is to provide a countercurrent flow liquid-solid contacting apparatus in one section of which nuclear fuel gel spheres settle in a processing liquid under the influence of gravity without appreciable mixing of the spheres and in another section of which the same spheres are fluidized for discharge from the apparatus.

These objects are achieved by a preferred embodiment of the invention comprising a pair of substantially cylindrical tubes having different diameters and each including a straight lower section inclined at an angle of about 45° relative to a horizontal plane and a straight upper section disposed substantially perpendicular to said plane, said tubes being communicatively joined to each other at their lower ends, a conduit extending into the lower end of the tube having the larger diameter for introducing liquid therein, a conduit for introducing a second stream of the same liquid into the upper end of the tube having the smaller diameter, a conduit extending into the upper end of the tube having the larger diameter for removing a stream of said liquid therefrom, a conduit feeding a particulate material into the upper end of the tube having the larger diameter, and a conduit extending into the upper end of the tube having the smaller diameter for removing a stream of said liquid and said particulate material therefrom.

DETAILED DESCRIPTION OF PREFERRED EMBODIMENTS OF THE INVENTION

Figure 1:
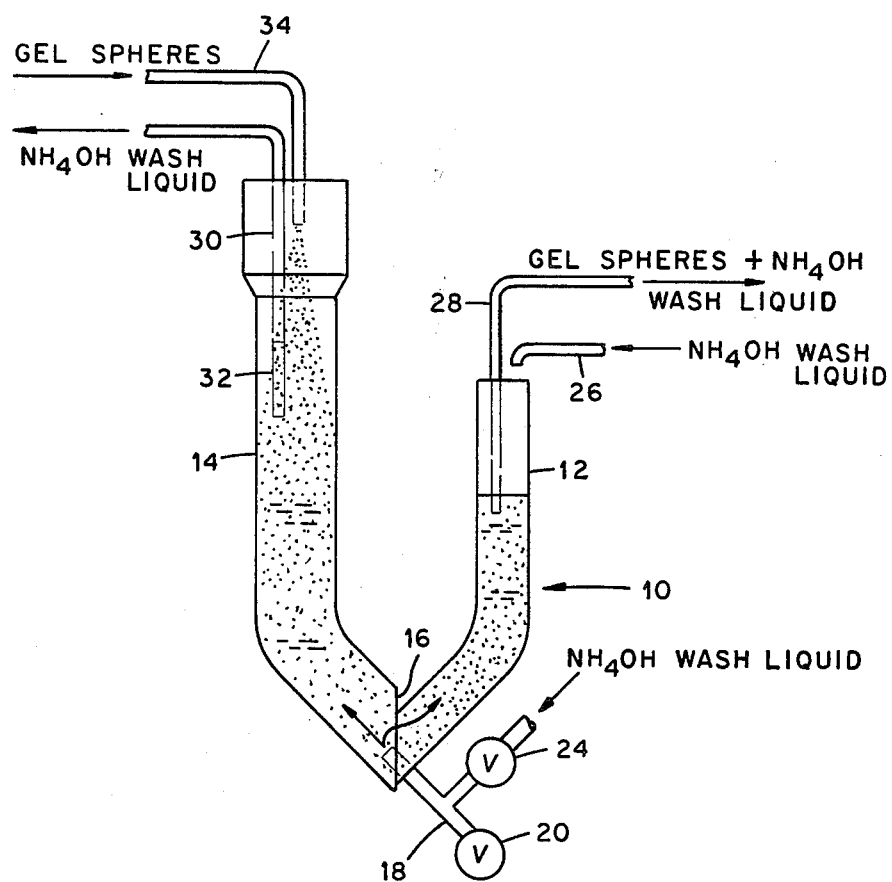
FIG. 1 is a schematic, cross-sectional view of a preferred embodiment of the invention.

In FIG. 1 reference number 10 generally designates a liquid-solid contacting apparatus which is constructed in accordance with the principles of this invention and which comprises two cylindrical tubes 12,14 having different diameters. More particularly, in an embodiment of the invention which has been tested, tube 12 has an I.D. of 5.1 cm and tube 14 has an I.D. of 7.6 cm. The lower edges of tubes 12,14 are coterminous, and tube 12 communicates with tube 14 through an aperture in a wall 16 fixed to both tubes. Each tube includes a straight lower section that is inclined at an angle of 45° relative to a horizontal plane and a straight upper portion which extends vertically from the lower section is joined therewith by a curved section. The lower section of tube 12 has a length of about 3 cm (short side), the upper section of this tube has a length of 61 cm, and the curved section between the straight sections is a 2 inch IPS schedule 40, 45° pipe ell. The lower section of tube 14 has a length of 2 cm (short side), the upper section of this tube has a length of 91 cm, and the curved section between the straight sections is a 3 inch IPS schedule 40, 45° pipe ell.

A conduit 18 extends in sealed relation through an aperture in the lower end of tube 12 and into the lower end of tube 14 for a distance of 2 cm, the longitudinal axis of the conduit being disposed at an angle of 45° relative to a horizontal plane and the conduit being spaced 0.1 cm from the wall of conduit 14 and having an I.D. of 0.8 cm. Connected to the outer end of conduit 18 is an outlet valve 20. A conduit 22 provided with a flow control valve 24 is also connected to conduit 18 and to a source of wash liquid. Another conduit 26 is arranged to feed a second stream of the same liquid into the upper end of tube 12. Conduits 28,30 respectively extend into the upper ends of tubes 12,14. Conduit 30 connects with a conventional pump (not illustrated) and is provided with a filter 32. Conduit 28 terminates as an open discharge of adjustable elevation. An input conduit 34 extends into the upper end of tube 14 and connects with a source of particulate material that will be described hereinafter.

Figure 2:
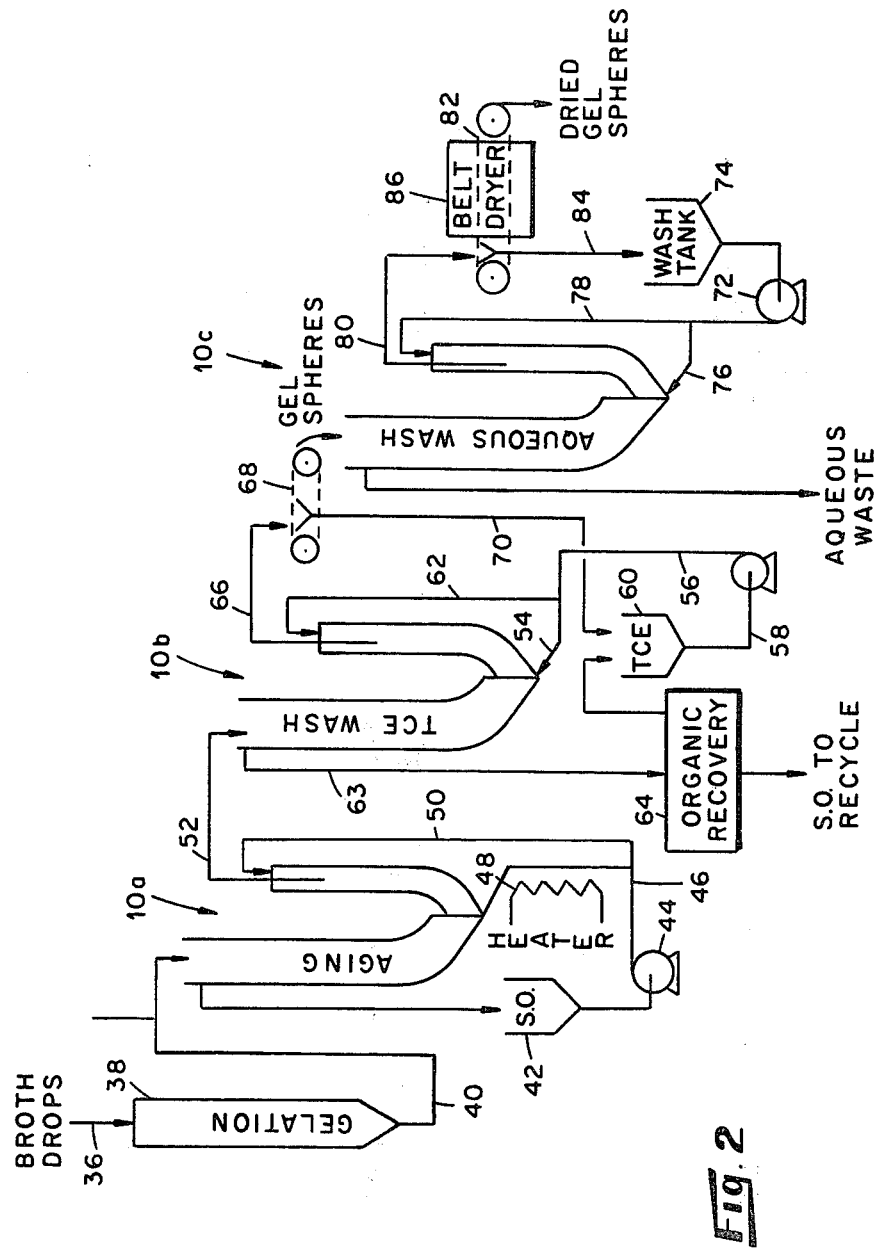
FIG. 2 is a schematic representation of a nuclear fuel processing system which utilizes three liquid-solid contactors of the type illustrated in FIG. 1.

FIG. 2 illustrates another embodiment of the invention which includes three liquid-solid contactors 10a–10c each of which is constructed as described above. The additional process apparatus associated with contactors 10a–10c will be described hereinafter.

OPERATION OF PREFERRED EMBODIMENTS OF THE INVENTION

The operational advantages of the liquid-solid contacting apparatus illustrated in FIG. 1 were demonstrated in tests wherein gel spheres containing nuclear fuel in the form of $UO_3$ were washed with 0.5 M $NH_4OH$ solution. Tubes 12,14 of the tested apparatus were constructed of glass so that flow of materials therein could be observed. The gel spheres, which had a diameter of about 0.35 cm, were fed into the upper end of tube 14 at a bulk flow rate of 3.5 liters/hour for about 4 hours. During this period of 4 hours a first stream of the above-mentioned NH$_4$OH solution was introduced into the lower ends of tubes 12,14 through conduit 18 at a rate of 3.2 liters/min for a first period of 2 hours and at a rate of 2.9 liters/min for a second period of 2 hours, and a second stream of the same solution was introduced into the upper end of conduit 12 through conduit 26 at a constant rate of 1.8 liters/min. The I.D. of conduit 28 was 1.7 cm and the end of this conduit within tube 12 was about 13 cm below the level of liquid in tube 14 during the described wash operation. During the initial 2 hours of operation of the apparatus, NH$_4$OH solution was withdrawn from the upper end of tube 14 through conduit 30 at a rate of 0.6 liter/min, and during the next 2 hour period the wash solution was withdrawn through conduit 30 at a rate of 0.3 liter/min. The portion of the wash liquid which was introduced into tube 14 through conduit 18 and which flowed upwardly through tube 12 and discharged through conduit 28 was 2.6 liters/min during the entire wash period of 4 hours, and all of the wash liquid introduced into the upper end of tube 12 through conduit 26 was also discharged through conduit 28. The average time that gel spheres were in the countercurrent wash zone was 1.3 hours.

The diameter of tube 14 and the flow rate of wash liquid through this larger diameter tube were selected so that the gel spheres discharged from conduit 34 settled in the wash liquid under the influence of gravity without appreciable mixing (i.e., the spheres settled as a moving bed), thus avoiding mixing and allowing efficient countercurrent contact of spheres and wash liquid in tube 14. However, the flow rate of wash liquid in the smaller diameter tube 12 was such that a fluidized mixture of the spheres and wash liquid was observed in this tube, which mixture flowed out of the upper section of tube 12 through conduit 28 together with the additional wash liquid added to tube 12 through conduit 26, this additional wash liquid assisting in fluidizing the spheres at the upper end of said tube 12. Analyses of the washed spheres showed NO$_3-$ decontamination factors (i.e., the ratio of NO$_3-$ ions in equilibrium with inlet spheres to NO$_3-$ ions in equilibrium with washed spheres) of $>400$ for the first 0.65 hour wash period and $>200$ for the second 0.65 hour wash period. The washed gel spheres were dried and found to be of good quality with no signs of damage or inadequate washing. It could be observed during the test that the V-shaped configuration of the liquid-solid contactor at joined lower ends of tubes 12,14 and the arrangement of inlet conduit 18 in tube 14 provided good fluidization of gel spheres at the junction of the tubes and consequently good transfer of the spheres from tube 14 into tube 12. As mentioned hereinbefore, tests conducted with a liquid-solid contactor having a U-shaped configuration showed poor transfer characteristics of particulate material at the bottom of the apparatus under corresponding flow conditions.

After the volume rate of solids to be processed is specified for a particular application, the important dimensions of a moving bed-fluidized bed column are selected as follows. A ratio of liquid volume/solid volume is selected to exceed the minimum process requirement without being wasteful. This ratio times the volume rate of solids gives the liquid rate through the moving bed. The waste liquid exit above the bed will be this rate plus any liquids that enter with the solids. The superficial liquid velocity which would cause fluidization is calculated by methods well-known in chemical engineering technology. The moving bed diameter is selected to give a superficial liquid velocity well below the fluidization velocity. The moving bed height is selected to give the solids residence time (bed volume/volume flow rate of solids) necessary to meet the process requirements. The exit flow of slurry from the fluidized bed side must be large enough to limit the solids concentration and avoid plugging of the exit line. Ten volume percent solids will usually flow well and higher concentrations are practical for slurries with good flow properties. The exit line diameter must be large enough to avoid bridging by the largest solid particle; this diameter should be at least four times the maximum particle diameter. For large particles, this line size and the velocity required to maintain solids movement in the line size and the velocity required to maintain solids movement in the line may result in a larger flow than the minimum required to limit the solids concentration. The fluidized bed diameter is selected so that the minimum fluidization flow would be exceeded if all the exit line flow was through the fluidized bed. The two inlet lines for liquid are sized so that the exit flow can be supplied completely by one inlet flow or by any split between them as required for good control of the solids movement. The height of the exit discharge is made adjuatable and is set by observation during initial operation to give a reasonable liquid level above the moving bed.

An example of specific column size calculations is as follows. The solids are UO$_3$ gel spheres of 1.5 g/cm$^3$ particle density and 5.6 liters per hour bulk volume flow rate. The wash liquid used in the tests that have been conducted was an aqueous solution consisting of 1.0 M (NH$_4$OH+NH$_4$NO$_3$) and other solutes with a density near 1.05 g/cm$^3$. The two gel sphere diameters of concern are 0.07 cm and 0.35 cm. A liquid volume/solid volume ratio of four is selected to assure good washing even if some uneven flows or channeling occurs. The liquid rate is then (4) (5.6)/60=0.37 liter per minute and this will be the waste liquid exit flow from above the moving bed. Using the methods of calculation in Perry's *Chemical Engineers' Handbook,* pages 5–52 to 5–54, the minimum fluidization velocities are about 0.28 cm/sec for 0.07 cm diameter and 2.8 cm/sec for 0.35 cm diameter. The minimum countercurrent wash time is about two hours for the 0.35 cm diameter, but could be much shorter for the small diameter. The minimum column cross section for the 0.07 cm diameter and 0.37 liter per minute is then 22 cm$^2$ area or 5.3 cm diameter. A conservative design is then one fourth the fluidization velocity or about 10 cm or 4 in diameter. The moving bed length to give a two hour residence time or (2) (5.6) volume is 40 cm or 4.7 ft. The bed length could be much shorter for the 0.07 cm diameter spheres. The slurry exit rates should be (10)(5.6)/60=1.0 liter per minute as a minimum. The line sizes should allow for larger particles than the average and should be about 1-cm-ID and 2-cm-ID for the 0.07 and 0.35 cm average particle sizes. The 1.0 liter per minute minimum flow for the 0.07 cm spheres and 1-cm-ID will provide good hydraulic flow, but the 2-cm-diameter line and 0.35 spheres will require about 5 liters per minute. The maximum column diameters for fluidization are then about 9 cm and 6 cm for the 0.07 and 0.35 cm spheres. A 5-cm diameter fluidized bed would allow fluidization.

FIG. 2 illustrates the use of a plurality of liquid-solid contactors of the disclosed type in a system for manufacturing nuclear fuel spheres. Drops of a broth containing $UO_3$ are discharged from line 36 into a gelation vessel 38, and the gelled spheres thus formed are transferred by means of a line 40 to the large diameter tube of contactor 10a. Silicone oil is pumped from tank 42 by pump 44 through line 46 to the lower end of contactor 10a, the oil being heated by heater 48 before entering the contactor. Silicone oil is also pumped by pump 44 through line 50 to the upper end of the smaller diameter tube of the contactor. Gelled spheres are hardened (or "aged") by contact with silicone oil in contactor 10a and then pass through line 52 to the upper end of the larger diameter tube of second contactor 10b, trichloroethylene (TCE) being introduced through line 54 and into the lower end of the second contactor by means of line 56 connected to pump 58 and to a storage tank 60 containing the TCE. A branch line 62 also conducts TCE into the upper end of the smaller diameter tube of contactor 10b. TCE which passes through the larger diameter tube of contactor 10b is conducted from the upper end of said tube through a conduit 63 to an organic recovery unit 64 which separates silicone oil from TCE and returns the latter to tank 60. Gel spheres and TCE wash liquid flow from the upper end of the smaller diameter tube of contactor 10b through line 66 to a porous conveyor belt 68 where spheres are separated from the wash liquid, the spheres then being carried by the conveyor belt to the upper end of the larger diameter tube of third contactor 10c and the wash liqud being recycled through line 70 to tank 60. An aqueous solution of $NH_4OH$ is pumped by pump 72 from tank 74 through line 76 into the lower end of contactor 10c and also through line 78 into the upper end of the samller diameter tube of that contactor. Spheres washed in contactor 10c flow through line 80 to a second porous conveyor belt 82 where $NH_4OH$ wash liquid is separated from the spheres and recycled to tank 74 via line 84, the spheres passing through a dryer 86 before being discharged from the conveyor belt. Many other uses for liquid-solid contactors constructed in accordance with the principles of this invention will be apparent to persons familiar with chemical process equipment.

We claim:

1. Apparatus for contacting particulate material with a liquid, comprising:

a pair of substantially cylindrical tubes having different diameters and each including a straight lower section inclined relative to a horizontal plane and a straight, vertically extending upper section, said tubes being communicatively joined to each other at their lower ends and said particulate material being introduced into the upper section of the tube having the larger diameter; and means for introducing said liquid into the lower ends of said tubes.

2. The apparatus of claim 1 including means for removing said liquid from the upper sections of said tubes.

3. The apparatus of claim 2 wherein the lower section of each of said tubes is inclined at an angle of about 45° relative to a horizontal plane.

4. The apparatus of claim 3 wherein said means for introducing said liquid into the lower ends of said tubes comprises a conduit which extends into the tube having the larger diameter.

5. The apparatus of claim 4 including means for introducing a second stream of said liquid into the upper section of the tube having the smaller diameter.

6. The apparatus of claim 5 including a conduit for introducing said particulate material into the upper section of the tube having the larger diameter.

7. The apparatus of claim 6 wherein said particulate material consists of gel spheres containing nuclear fuel.

* * * * *